(12) United States Patent
Baruch et al.

(10) Patent No.: US 10,628,268 B1
(45) Date of Patent: Apr. 21, 2020

(54) PROOF OF DATA REPLICATION CONSISTENCY USING BLOCKCHAIN

(71) Applicant: EMC IP Holding Company LLC, Hopkinton, MA (US)

(72) Inventors: Leehod Baruch, Rishon Leziyon (IL); Assaf Natanzon, Tel Aviv (IL); Jehuda Shemer, Kfar Saba (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 434 days.

(21) Appl. No.: 15/380,013

(22) Filed: Dec. 15, 2016

(51) Int. Cl.
*G06F 16/00* (2019.01)
*G06F 11/14* (2006.01)
*G06F 16/27* (2019.01)

(52) U.S. Cl.
CPC ........ *G06F 11/1466* (2013.01); *G06F 16/275* (2019.01); *G06F 2201/82* (2013.01)

(58) Field of Classification Search
CPC ...................................................... G06F 16/00
See application file for complete search history.

(56) References Cited

U.S. PATENT DOCUMENTS

| | | | |
|---|---|---|---|
| 7,203,741 B2 | 4/2007 | Marco et al. | |
| 7,719,443 B1 | 5/2010 | Natanzon | |
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,860,836 B1 | 12/2010 | Natanzon et al. | |
| 7,882,286 B1 | 2/2011 | Natanzon et al. | |
| 7,934,262 B1 | 4/2011 | Natanzon et al. | |
| 7,958,372 B1 | 6/2011 | Natanzon | |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |
| 8,103,937 B1 | 1/2012 | Natanzon et al. | |
| 8,108,634 B1 | 1/2012 | Natanzon et al. | |
| 8,214,612 B1 | 7/2012 | Natanzon | |
| 8,250,149 B2 | 8/2012 | Marco et al. | |
| 8,271,441 B1 | 9/2012 | Natanzon et al. | |
| 8,271,447 B1 | 9/2012 | Natanzon et al. | |
| 8,332,687 B1 | 12/2012 | Natanzon et al. | |
| 8,335,761 B1 | 12/2012 | Natanzon | |
| 8,335,771 B1 | 12/2012 | Natanzon et al. | |
| 8,341,115 B1 | 12/2012 | Natanzon et al. | |
| 8,370,648 B1 | 2/2013 | Natanzon | |
| 8,380,885 B1 | 2/2013 | Natanzon | |

(Continued)

OTHER PUBLICATIONS

U.S. Appl. No. 14/496,783, filed Sep. 25, 2014, Natanzon et al.

(Continued)

*Primary Examiner* — Khanh B Pham
(74) *Attorney, Agent, or Firm* — Daly, Crowley, Mofford & Durkee, LLP (57) ABSTRACT

Described embodiments provide systems and methods for verifying replicas of a storage system. A replica of a production site of the storage system is generated. A hash value associated with the generated replica is also generated. The replica is provided to a cloud backup provider. The hash value associated with the generated replica is provided to a blockchain in communication with the production site and the cloud backup provider. The blockchain may be employed to verify the replica.

18 Claims, 7 Drawing Sheets

(56) References Cited

U.S. PATENT DOCUMENTS

| | | |
|---|---|---|
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,792,384 B2* | 10/2017 | Riemers .............. G06F 16/9574 |
| 9,798,472 B1 | 10/2017 | Natanzon et al. |
| 9,798,490 B1 | 10/2017 | Natanzon |
| 9,804,934 B1 | 10/2017 | Natanzon et al. |

(56) References Cited

U.S. PATENT DOCUMENTS

| | | |
|---|---|---|
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 10,055,146 B1 | 8/2018 | Natanzon et al. |
| 10,055,148 B1 | 8/2018 | Natanzon et al. |
| 10,061,666 B1 | 8/2018 | Natanzon et al. |
| 10,067,694 B1 | 9/2018 | Natanzon et al. |
| 10,067,837 B1 | 9/2018 | Natanzon et al. |
| 10,078,459 B1 | 9/2018 | Natanzon et al. |
| 10,082,980 B1 | 9/2018 | Cohen et al. |
| 10,083,093 B1 | 9/2018 | Natanzon et al. |
| 10,095,489 B1 | 10/2018 | Lieberman et al. |
| 10,101,943 B1 | 10/2018 | Ayzenberg et al. |
| 10,108,356 B1 | 10/2018 | Natanzon et al. |
| 10,108,507 B1 | 10/2018 | Natanzon |
| 10,108,645 B1 | 10/2018 | Bigman et al. |
| 10,114,581 B1 | 10/2018 | Natanzon et al. |
| 10,120,787 B1 | 11/2018 | Shemer et al. |
| 10,120,925 B1 | 11/2018 | Natanzon et al. |
| 10,126,946 B1 | 11/2018 | Natanzon et al. |
| 10,133,874 B1 | 11/2018 | Natanzon et al. |
| 10,140,039 B1 | 11/2018 | Baruch et al. |
| 10,146,436 B1 | 12/2018 | Natanzon et al. |
| 10,146,639 B1 | 12/2018 | Natanzon et al. |
| 10,146,675 B1 | 12/2018 | Shemer et al. |
| 10,146,961 B1 | 12/2018 | Baruch et al. |
| 10,148,751 B1 | 12/2018 | Natanzon |
| 10,152,246 B1 | 12/2018 | Lieberman et al. |
| 10,152,267 B1 | 12/2018 | Ayzenberg et al. |
| 10,152,384 B1 | 12/2018 | Amit et al. |
| 10,157,014 B1 | 12/2018 | Panidis et al. |
| 10,185,583 B1 | 1/2019 | Natanzon et al. |
| 10,191,677 B1 | 1/2019 | Natanzon et al. |
| 10,191,687 B1 | 1/2019 | Baruch et al. |
| 10,191,755 B1 | 1/2019 | Natanzon et al. |
| 10,203,904 B1 | 2/2019 | Natanzon et al. |
| 10,210,073 B1 | 2/2019 | Baruch et al. |
| 10,223,007 B1 | 3/2019 | Natanzon et al. |
| 10,223,023 B1 | 3/2019 | Natanzon et al. |
| 10,223,131 B1 | 3/2019 | Lieberman et al. |
| 10,229,006 B1 | 3/2019 | Natanzon et al. |
| 10,229,056 B1 | 3/2019 | Panidis et al. |
| 2018/0091524 A1* | 3/2018 | Setty .................. H04L 63/12 |
| 2018/0157700 A1* | 6/2018 | Roberts ............ G06F 16/2365 |
| 2018/0191502 A1* | 7/2018 | Karame ............. G06Q 20/065 |

OTHER PUBLICATIONS

U.S. Appl. No. 14/496,790, filed Sep. 25, 2014, Cohen et al.
U.S. Appl. No. 14/559,036, filed Dec. 3, 2014, Natanzon et al.
U.S. Appl. No. 14/753,389, filed Jun. 29, 2015, Nir et al.
U.S. Appl. No. 14/976,719, filed Dec. 21, 2015, Natanzon.
U.S. Appl. No. 14/978,378, filed Dec. 22, 2015, Bigman et al.
U.S. Appl. No. 15/085,148, filed Mar. 30, 2016, Baruch et al.
U.S. Appl. No. 15/274,362, filed Sep. 23, 2016, Baruch et al.
U.S. Appl. No. 15/275,768, filed Sep. 26, 2016, Natanzon et al.
U.S. Appl. No. 15/275,756, filed Sep. 26, 2016, Natanzon et al.
U.S. Appl. No. 15/379,940, filed Dec. 15, 2016, Baruch et al.
U.S. Appl. No. 15/386,754, filed Dec. 21, 2016, Shemer et al.
U.S. Appl. No. 15/390,996, filed Dec. 27, 2016, Natanzon et al.
U.S. Appl. No. 15/391,030, filed Dec. 27, 2016, Shemer et al.
U.S. Appl. No. 15/970,243, filed May 3, 2018, Schneider et al.
U.S. Appl. No. 16/052,037, filed Aug. 1, 2018, Schneider et al.
U.S. Appl. No. 16/048,763, filed Jul. 30, 2018, Schneider et al.
U.S. Appl. No. 16/050,400, filed Jul. 31, 2018, Alkalay et al.
U.S. Appl. No. 16/179,295, filed Nov. 2, 2018, Natanzon et al.
U.S. Appl. No. 16/261,174, filed Jan. 29, 2019, Natanzon et al.
U.S. Appl. No. 16/368,008, filed Mar. 28, 2019, Natanzon et al.

* cited by examiner

PROOF OF DATA REPLICATION CONSISTENCY USING BLOCKCHAIN

BACKGROUND

A storage system may include data protection systems that back up production site data by replicating production site data on a secondary backup storage system (e.g., a replication site). The backup storage system may be situated in a physically remote location from the production site and, in some instances, the backup storage system may be provided by a third party (e.g., a cloud-based backup system). In such systems, it may be desirable to independently verify data sent to, and received from, the third-party cloud backup system and/or to verify compliance with a service level agreement (SLA).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect provides a method for verifying replicas of a storage system. A replica of a production site of the storage system is generated. A hash value associated with the generated replica is also generated. The replica is provided to a cloud backup provider. The hash value associated with the generated replica is provided to a blockchain in communication with the production site and the cloud backup provider. The blockchain may be employed to verify the replica.

Another aspect provides a system that includes a processor and memory storing computer program code that when executed on the processor causes the processor to operate a storage system. The storage system is operable to perform the operations of generating a replica of a production site of the storage system and generating a hash value associated with the generated replica. The replica is provided to a cloud backup provider. The hash value associated with the generated replica is provided to a blockchain in communication with the production site and the cloud backup provider. The blockchain may be employed to verify the replica.

Another aspect provides a computer program product including a non-transitory computer readable storage medium having computer program code encoded thereon that when executed on a processor of a computer causes the computer to operate a storage system. The computer program product includes computer program code for generating a replica of a production site of the storage system and generating a hash value associated with the generated replica. The replica is provided to a cloud backup provider. The hash value associated with the generated replica is provided to a blockchain in communication with the production site and the cloud backup provider. The blockchain may be employed to verify the replica.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Before describing embodiments of the concepts, structures, and techniques sought to be protected herein, some terms are explained. In some embodiments, the term "I/O request" or simply "I/O" may be used to refer to an input or output request (e.g., a data read or data write request). The term "storage system" may encompass physical computing systems, cloud or virtual computing systems, or a combination thereof. The term "storage device" may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN)). The term "storage device" may also refer to a storage array including multiple storage devices.

Figure 1:
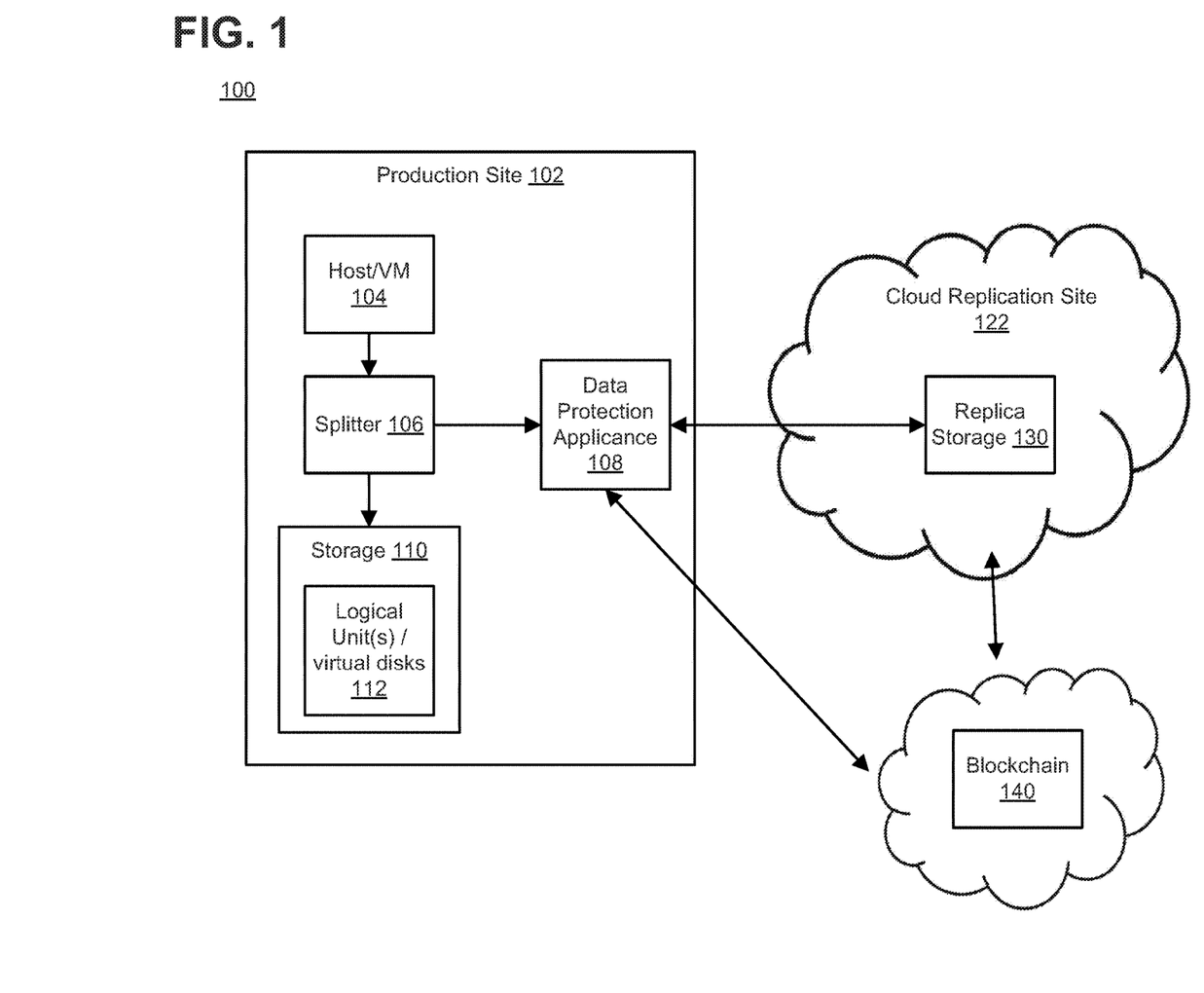
FIG. 1 is a block diagram of a data protection system, in accordance with illustrative embodiments.

Referring to the illustrative embodiment shown in FIG. 1, data protection system 100 may include production site 102, which may generally be a facility where one or more hosts and/or virtual machines 104 run data processing applications that read data from and write data to a storage system 110. Production site 102 may back up (e.g., replicate) production data to cloud replication site 122 (e.g., replication site 122 may be a "virtual" or "cloud" replication site located remotely from production site 102 and in communication via a network link such as the Internet, etc.).

Cloud replication site 122 may replicate production site data and enable rollback of data of production site 102 to an earlier point in time (PIT). Rollback may be used in the event of data corruption of a disaster, or alternatively in order to view or to access data from an earlier point in time.

As shown in FIG. 1, production site 102 may include a host or virtual machine (VM) 104, splitter 106, storage (or storage array) 110, and a data protection appliance (DPA) 108. In some embodiments, host 104 may write to a logical unit or virtual disk in storage 110. Host 104 may include one or more devices (or "nodes") that may be designated an "initiator," a "target", or both, coupled by communication links appropriate for data transfer, such as an InfiniBand (IB) link or Fibre Channel (FC) link, and/or a network, such as an Ethernet or Internet (e.g., TCP/IP) network that may employ, for example, the iSCSI protocol.

Production site storage 110 and cloud replication site replica storage 130 may include storage devices for storing data, such as disks or arrays of disks. Storage 110 may provide (e.g., expose) one or more logical units (LUs) 112 to which production commands are issued. As described herein, an LU is a logical entity provided by a storage system for accessing data stored therein. In some embodiments, a logical unit may be a physical logical unit or a virtual logical unit, and may be identified by a unique logical unit number (LUN).

In some embodiments, DPA 108 may perform various data protection services, such as data replication of storage system 100, and journaling of I/O requests issued by device 104. DPA 108 may also enable rollback of production data in storage 110 to an earlier point-in-time (PIT) from replica data stored in cloud replica storage 130, and enable processing of rolled back data at the production site. In some embodiments, each DPA 108 may be a physical device, a virtual device, or may be a combination of a virtual and physical device.

In some embodiments, DPA 108 may be-receive commands (e.g., SCSI commands) issued by host 104 to storage 110. For example, splitter 106 may intercept commands from host 104, and provide the commands to storage 110 and also to DPA 108. Splitter 106 may act on intercepted SCSI commands issued to a logical unit or virtual disk 112 in one of the following ways: send the SCSI commands to its intended LU; redirect the SCSI command to another LU; split the SCSI command by sending it first to DPA 108 and, after DPA 108 returns an acknowledgement, send the SCSI command to its intended LU; fail a SCSI command by returning an error return code; and delay a SCSI command by not returning an acknowledgement to the respective host. In some embodiments, splitter 106 may handle different SCSI commands, differently, according to the type of the command. For example, in some embodiments, a SCSI command inquiring about the size of a certain LU may be sent directly to that LU, whereas a SCSI write command may be split and sent to DPA 108.

In certain embodiments, splitter 106 and DPA 108 may be drivers located in host devices of production site 102. Alternatively, in some embodiments, a protection agent may be located in a fiber channel switch, or in any other device situated in a data path between host 104 and storage 110. In a virtualized environment, the protection agent may run at the hypervisor layer or in a virtual machine providing a virtualization layer. For example, in such embodiments, a hypervisor may consume LUs and may generate a distributed file system on the logical units or virtual disks 112 such as Virtual Machine File System (VMFS) that may generate files in the file system and expose the files as LUs to the virtual machines (e.g., each virtual disk is seen as a SCSI device by virtual machine hosts). In another embodiment, a hypervisor may consume a network based file system and exposes files in the Network File System (NFS) as SCSI devices to virtual hosts.

In some embodiments, production DPA 108 may send its write transactions to cloud replication site 122 using a variety of modes of transmission, such as continuous replication or snapshot replication. For example, in continuous replication, production DPA 108 may send each write transaction to storage 110 and also send each write transaction to cloud replication site 122 to be replicated on cloud replica storage 130. In snapshot replication, production DPA 108 may receive several I/O requests and combine them into an aggregate "snapshot" or "batch" of write activity performed to storage 110 in the multiple I/O requests, and may send the snapshot to cloud replication site 122 for journaling and incorporation in in replica storage 130. In such embodiments, a snapshot replica may be a differential representation of a volume. For example, the snapshot may include pointers to the original volume, and may point to log volumes for locations of the original volume that store data changed by one or more I/O requests. In some embodiments, snapshots may be combined into a snapshot array, which may represent different images over a time period (e.g., for multiple PITs).

As described herein, when replicating data, the history may frequently be maintained in a journal. For example, such a journal may be implemented as described in as described in U.S. Pat. No. 7,516,287, issued Apr. 7, 2009, and entitled "Methods and Apparatus for Optimal Journaling for Continuous Data Replication," which is hereby incorporated by reference herein. For example, in continuous replication, the journal may typically be implemented as a block device storing the history in a data structure or file system. In snapshot replication, the journal may typically contain only metadata that points to the snapshot replicas that hold the history.

In conventional systems, for example when the user/owner of the production site is also the owner of the replication site, the user has full control of both the production site and replication site and can have high degree of confidence in the consistency of the replicated data. For example, the user can directly monitor the creation and deletion of images and perform periodic testing of the images. However, when replicating to a cloud backup provider, the user no longer controls the replication site, and relies upon the cloud backup provider to generate points in time (PITs) at the correct times, to maintain consistent images in the journal, and provide the required retention time of the images. Such terms are typically specified in a service level agreement (SLA) between the cloud backup provider and the production site user.

Further, the production site user relies upon the cloud backup provider to provide the correct image for a given point in time (e.g., the image is from the correct time) and that the provided image is consistent with the correct production data at that point in time. Frequently, in such conventional systems, the production site user may not be able to verify the performance of the cloud backup provider since the user may not have a separate copy of the data from that same point in time for comparison. For example, if a disaster (e.g., data loss) occurs at the production site, the user will request an image from the cloud backup provider to restore the production volumes to contain the data at a point in time most recently before the disaster. If the image provided from the cloud backup provider is an older image than the most recent image before the disaster, the user would not have a way to prove otherwise (e.g., cannot prove whether the cloud backup provider is in compliance with the SLA). Similarly, the cloud backup provider cannot prove to the user that they are in compliance with the SLA.

As will be described herein, illustrative embodiments may employ a blockchain, such as blockchain 140, to validate, without relying on any third party, that an image (or replica) a cloud backup provider gives to a production site user represents the correct point in time (PIT) and it is consistent with the data of the protected production volumes at that time.

For example, in described embodiments, production site 102 may maintain a record of a hash value of each complete protected volume of storage 110. Production site 102 may periodically send these hash values to blockchain 140 as a proof of existence of a given image or replica of the protected volume(s). The cloud backup provider (e.g., cloud replication site 122) that receives replicated data may also maintain a record of a hash value of each complete protected volume. Various embodiments may employ any cryptographically sound hash function.

When the cloud backup provider receives an image, the cloud backup provider may determine a hash value of the received image, and also receive the hash value that the production site provided to the blockchain. If the hash value generated by the cloud backup provider matches the hash value provided by the production site to the blockchain, the cloud backup provider can acknowledge that the correct image or replica has been received, and, thus, acknowledge the image or replica as a transaction in the blockchain. This acknowledgment proves that the correct data has reached the cloud backup provider (e.g., the blockchain can be used to prove when consistent data was received by the cloud provider). As a result, described embodiments provide both the production site and the cloud backup provider a way to prove when each party received consistent data at a given point in time.

Similarly, when a user of production site 102 accesses a given image or replica (e.g., a given PIT) from cloud replication site 122, the production site may generate a hash value of the image received from cloud replication site 122, and compare the generated hash value to the hash value stored in blockchain 140 to verify that the received image is consistent and truly represents the requested PIT. Thus, the cloud backup provider cannot claim that a consistent PIT was not received, since the blockchain provides a transaction receipt. Similarly, the cloud backup provider cannot provide an image from an incorrect time, since the production site user can verify the PIT from the blockchain. Congruently, the production site user cannot claim that the cloud backup provider is providing an incorrect or inconsistent image since the blockchain independently verifies the PIT image.

Therefore, described embodiments allow proof of image data consistency by any production site and any cloud backup provider. Further, the blockchain proof is not dependent on any third-party organization and is tamper-resistant. Both users (e.g., production sites) and cloud backup providers can check and verify compliance with service level agreements (SLAs) through an independent blockchain. Further, both users (e.g., production sites) and cloud backup providers can monitor the blockchain (either periodically or in real time) to detect and/or correct inconsistencies between images (e.g. indicating an error, performing a full sweep replication of the production volume(s), maintaining transaction logs for analysis, etc.).

For example, referring back to FIG. 1, production site 102 and cloud replication site 122 may be in communication with blockchain 140. Blockchain 140 may be a distributed data structure that stores a list of transactions and can be thought of as a distributed database (or ledger) of transactions between a source and a destination. Transactions may be bundled into blocks that are linked to other blocks in a chain. Distributed (e.g., cloud) computer nodes maintain the entire blockchain (e.g., all the distributed nodes can access the entire history of the blockchain) and cryptographically validate transactions contained in a corresponding block.

A blockchain maintains integrity (e.g., is difficult to tamper with) because each block refers to or includes a cryptographic hash value of any prior blocks. Accordingly, it can be difficult to modify or tamper with the transactions contained within the block since even a small modification to the data will change the hash value of the entire block.

Identifiers of sources and destinations used for blockchain transactions may be generated by cryptography such as public key cryptography. For example, an identifier may be generated based upon a private key. The relationship between the private key and the identifier can later be used to prove that the identifier is associated with the transaction. In other words, the identifier can be used to create another transaction based upon the prior transaction.

Figure 2:
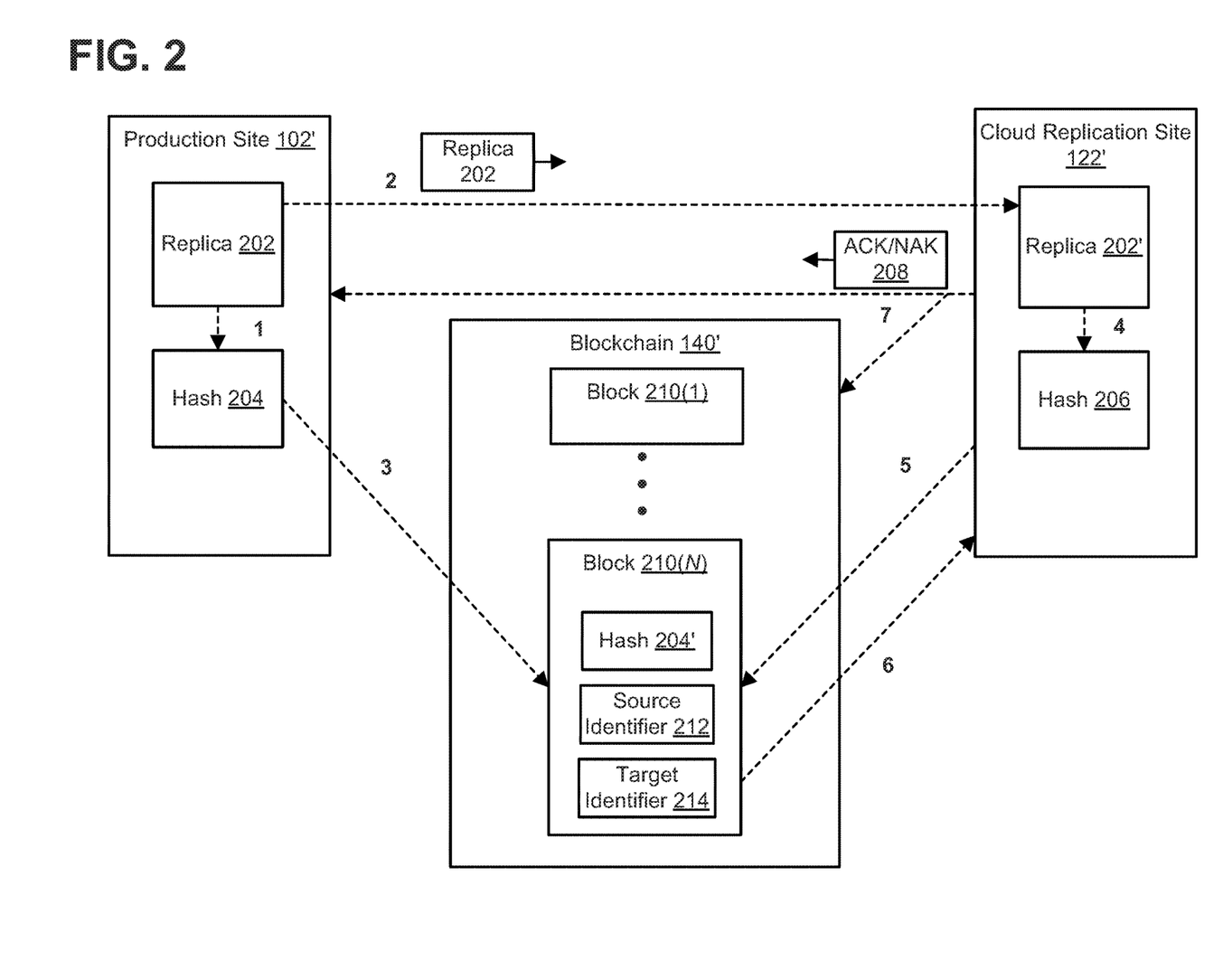
FIG. 2 is a logical diagram illustrating an interaction between a production site, a cloud replication site and a blockchain for a replication operation, in accordance with illustrative embodiments.

An illustrative blockchain is shown in FIG. 2 as blockchain 140'. As shown in FIG. 2, blockchain 140' may include one or more blocks 210(1)-210(N), referred to generally herein as blocks 210. Each block may include a hash value (e.g., hash value 204') and at least one identifier associated with the hash value, for example source identifier 212 and target identifier 214. As will be described in greater detail, source identifier 212 may be a public key value or other unique identifier associated with production site 102', and target identifier 214 may be a public key value or other unique identifier associated with cloud replication site 122'.

FIG. 2 also shows a representative logical flow of data for a replication operation between production site 102', cloud replication site 122', and blockchain 140'. As shown, production site 102' generates an image or replica 202, and generates a hash 204 of replica 202, as indicated by dashed line 1. For example, replica 202 may be generated due to continuous replication (e.g., as write operations occur at production site 102'), snapshot replication (e.g., after a given time interval, after a given number of write operations, etc.), or a hybrid replication technique that performs a mix of continuous and snapshot replication. Production site 202 sends replica 202 to cloud replication site 122', as indicated by dashed line 2. Production site 102' sends hash 204 to blockchain 140', as indicated by dashed line 3. Blockchain 140' may store hash 204' as a transaction in a given block 210, along with a source identifier 212 that is uniquely associated with production site 102'. Although not shown in FIG. 2, block 210 may include other information about the transaction (e.g., hash 204'), such as a date and timestamp indicating when blockchain 140' received hash 204'.

Cloud replication site 122' receives replica 202 as replica 202', and generates hash 206 of replica 202', as indicated by dashed line 4. Cloud replication site 122' requests hash 204' from blockchain 140' (e.g., cloud replication site 122' requests the hash in blockchain 140' that is associated with the replica 202' received by cloud replication site 122'), as indicated by dashed line 5. Blockchain 140' may send hash 204' to cloud replication site 122', as indicated by dashed line 6. Cloud replication site 122' compares hash 204' and hash 206.

If hash 204' and hash 206 match, then cloud replication site 122' has received the correct replica 202 (e.g., the data of replica 202' received by cloud replication site 122' is consistent with the data of replica 202 generated and sent by production site 102'). Cloud replication site 122' sends an acknowledgement (ACK 208) of the replica to production site 102' and/or blockchain 140', as indicated by dashed line 7. For example, blockchain 140' may record ACK 208 as a transaction in block 210, for example along with target identifier 214 that is uniquely associated with cloud replication site 122' and a date and timestamp indicating when blockchain 140' received ACK 208.

Alternatively, if hash 204' and hash 206 do not match, then cloud replication site 122' has not received the correct replica 202 (e.g., the data of replica 202' received by cloud replication site 122' is not consistent with the data of replica 202 generated and sent by production site 102'). Cloud replication site 122' may send a negative acknowledgement (NAK 208) of the replica to production site 102' and/or blockchain 140', as indicated by dashed line 7. For example, blockchain 140' may record NAK 208 as a transaction in block 210, for example along with target identifier 214 that is uniquely associated with cloud replication site 122' and a date and timestamp indicating when blockchain 140' received NAK 208.

Thus, blockchain 140' may act as a record to confirm whether (and when) cloud replication site 122' received correct replica data from production site 102'.

For example, as shown in FIG. 2, for snapshot replication the hash is sent to the blockchain whenever a snapshot replica is created by the production site. The cloud backup provider acknowledges when a snapshot replica is received. For continuous replication, the production site may periodically send hash values to the blockchain. Due to latency of the blockchain (e.g., some blockchain implementations have an elapsed time before confirming or recording a transaction, for example on the order of several minutes for the Bitcoin blockchain), the production site (e.g., production site 102') may also send the hash value (e.g., hash 204) directly to the cloud backup provider (e.g., cloud replication site 122') through a dedicated application programming interface (API). The cloud backup provider may generate a hash of the received replica (e.g., hash 206) and compare the generated hash to the hash received directly from the production site, rather than comparing the generated hash to a hash value received from the blockchain. In embodiments where cloud backup provider receives the hash value from the production site, the cloud backup provider may verify that the hash value of the replica is written to the blockchain prior to sending an acknowledgement of the replica.

Figure 3:
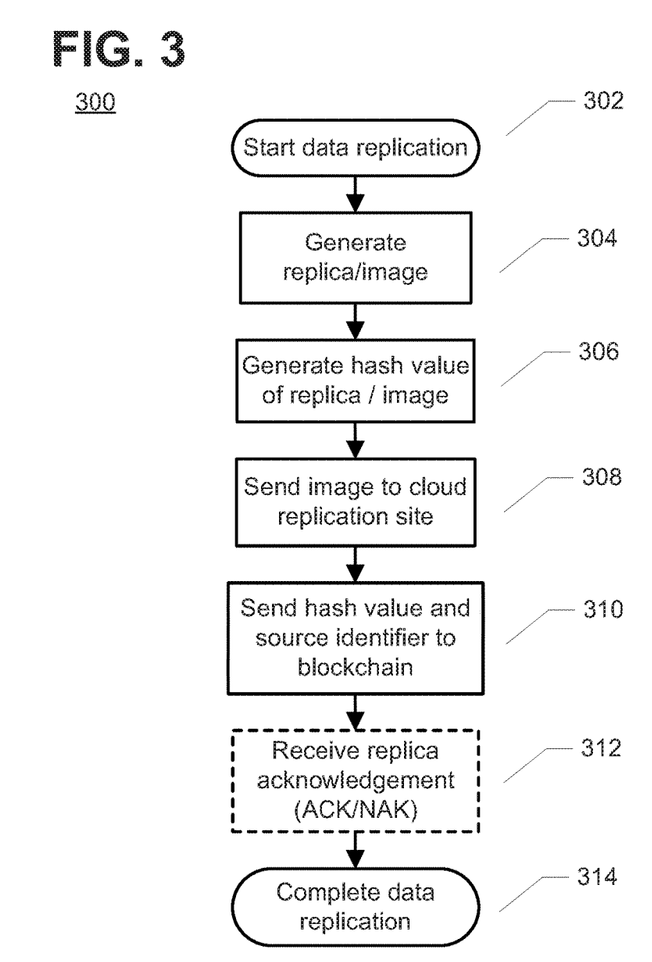
FIG. 3 is a flowchart of an illustrative replication process of a production site in a data protection system, in accordance with illustrative embodiments.

Referring to FIG. 3, an illustrative process 300 for performing data replication is shown. For example, process 300 might be performed by production site 102 whenever a replica or image is generated. At block 302, process 300 begins. At block 304, production site 102 (for example, data protection appliance 108) generates a replica or image of data written to storage 110. At block 306, production site 102 (e.g., DPA 108) generates a hash value of the replica generated at block 304. At block 308, the replica is sent to cloud replication site 122. At block 310, production site 102 sends the hash value generated at block 306, along with a source identifier (e.g., 212) that is uniquely associated with the production site, to blockchain 140. As described herein, in some embodiments, production site 102 may also send the hash value generated at block 306 to cloud replication site 122. At block 312, production site 102 may optionally receive either an acknowledgement (ACK), or a negative acknowledgement (NAK), from cloud replication site 122 indicative of whether cloud replication site 122 has received the correct replica. At block 314, process 300 completes.

Figure 4:
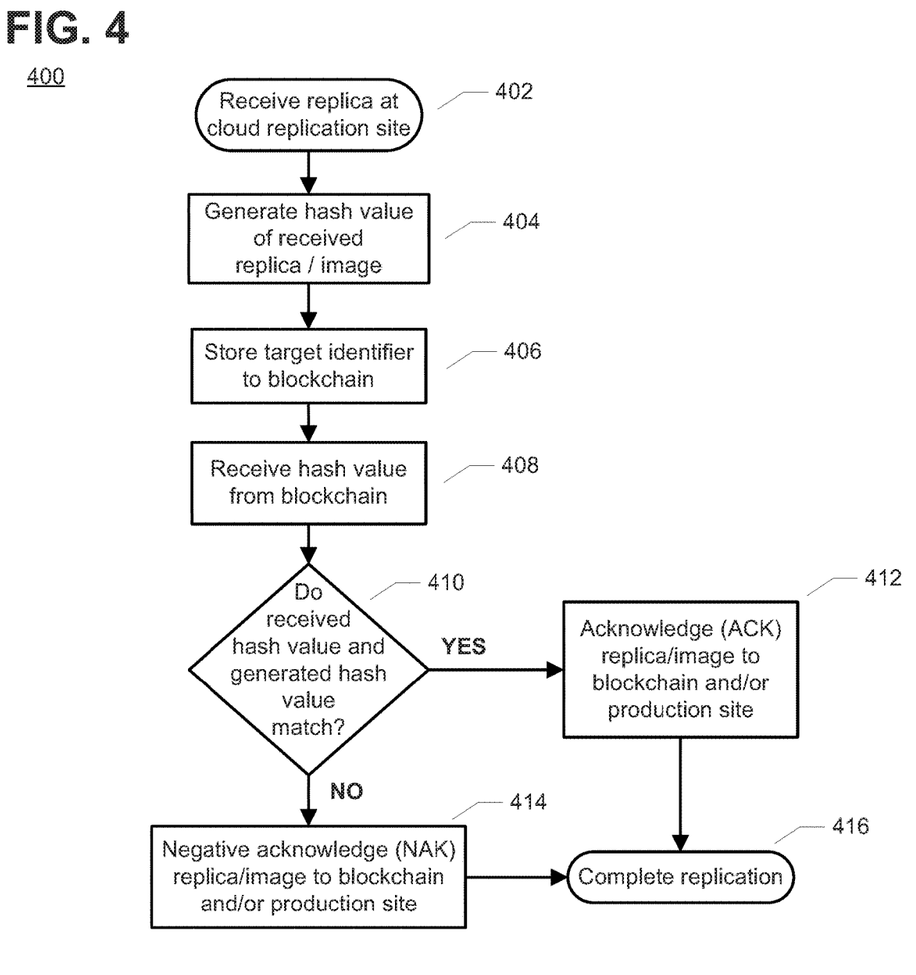
FIG. 4 is a flowchart of an illustrative replication process of a cloud replication site in a data protection system, in accordance with illustrative embodiments.

Referring to FIG. 4, an illustrative process 400 for performing data replication is shown. For example, process 400 might be performed by cloud replication site 122 whenever an image or replica is received from production site 102. At block 402, process 400 begins, for example when a replica is received at the cloud replication site. At block 404, cloud replication site 122 generates a hash value of the received replica. At block 406, the cloud replication site may request the hash value (e.g., hash 204' of FIG. 2) from blockchain 140 and also store a target identifier (e.g., 214) that is uniquely associated with the cloud replication site, to blockchain 140. At block 408, cloud replication site 122 receives the hash value (e.g., 204') from the blockchain. Alternatively, as described herein, in some embodiments production site 102 may send the hash value (e.g., 204) directly to the cloud replication site 122 through an API.

At block 410, if the hash value generated at block 404 and the hash value received at block 408 match, then at block 412, cloud replication site 122 sends an acknowledgement (ACK) of receipt of the correct replica. For example, the ACK may be sent to one or both of production site 102 and blockchain 140. In embodiments where cloud backup provider receives the hash value from the production site, the cloud backup provider may verify that the hash value of the replica is written to the blockchain prior to sending an acknowledgement of the replica. If, at block 410, the hash value generated at block 404 and the hash value received at block 408 do not match, then at block 414, cloud replication site 122 may send a negative acknowledgement (NAK) of receipt of the replica. For example, the NAK may be sent to one or both of production site 102 and blockchain 140. At block 416, process 400 completes.

Figure 5:
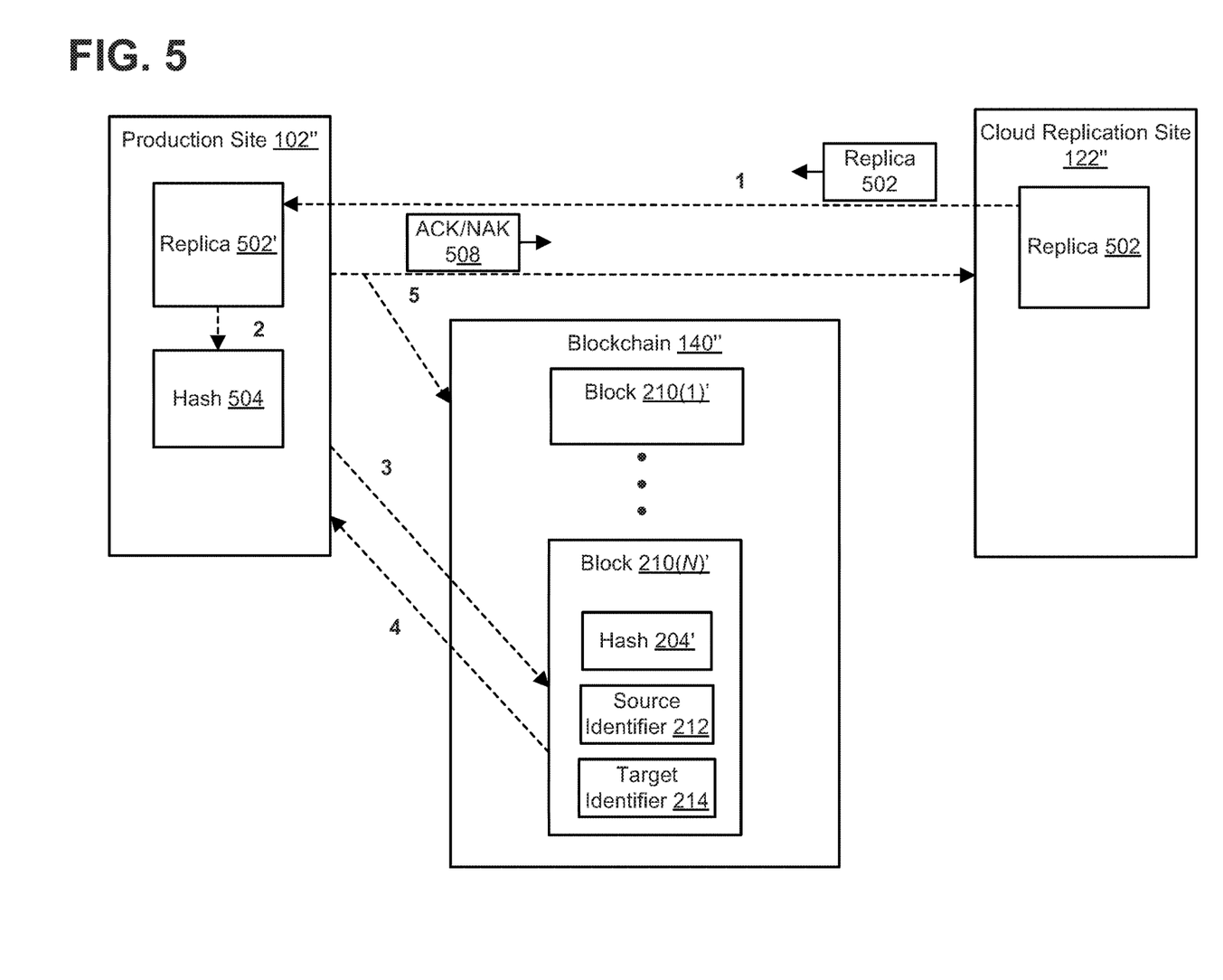
FIG. 5 is a logical diagram illustrating an interaction between a production site, a cloud replication site and a blockchain for an image recovery operation, in accordance with illustrative embodiments.

FIG. 5 shows a representative logical flow of data for an image or replica recovery operation between production site 102", cloud replication site 122", and blockchain 140". As shown, cloud replication site 122" may send a requested replica or image 502 to production site 102", as indicated by dashed line 1. Production site 102" receives the replica as replica 502' and generates a hash 504 of replica 502', as indicated by dashed line 2. Production site 102" requests hash 204' from blockchain 140" (e.g., production site 102" requests the hash in blockchain 140" that is associated with the replica 502' received by production site 102"), as indicated by dashed line 3. Blockchain 140" sends hash 204' to production site 102", as indicated by dashed line 4. Production site 102" compares hash 204' and hash 504.

If hash 204' and hash 504 match, then production site 102" has received the correct replica 202 (e.g., the data of replica 502' received by production site 102" is consistent with the data of the replica originally generated and sent by production site 102" to cloud replication site 122", as recorded by blockchain 140"). Production site 102" may send an acknowledgement (ACK 508) of the replica to cloud replication site 122" and/or blockchain 140", as indicated by dashed line 5. For example, blockchain 140" may record ACK 508 as a transaction in the blockchain, for example along with source identifier 212 that is uniquely associated with production site 102" and a date and timestamp indicating when blockchain 140' received ACK 508.

Alternatively, if hash 204' and hash 504 do not match, then production site 102" has not received the correct replica 502 (e.g., the data of replica 502' received by production site 102" is not consistent with the data of the replica originally generated and sent by production site 102" to cloud replication site 122"). Production site 102" may send a negative acknowledgement (NAK 508) of the replica to cloud replication site 122" and/or blockchain 140", as indicated by dashed line 5. For example, blockchain 140" may record NAK 508 as a transaction in the blockchain, for example along with source identifier 212 that is uniquely associated with production site 102" and a date and timestamp indicating when blockchain 140' received NAK 508.

Thus, blockchain 140" may act as a record to confirm whether (and when) production site 102" received correct replica data from cloud replication site 122".

Figure 6:
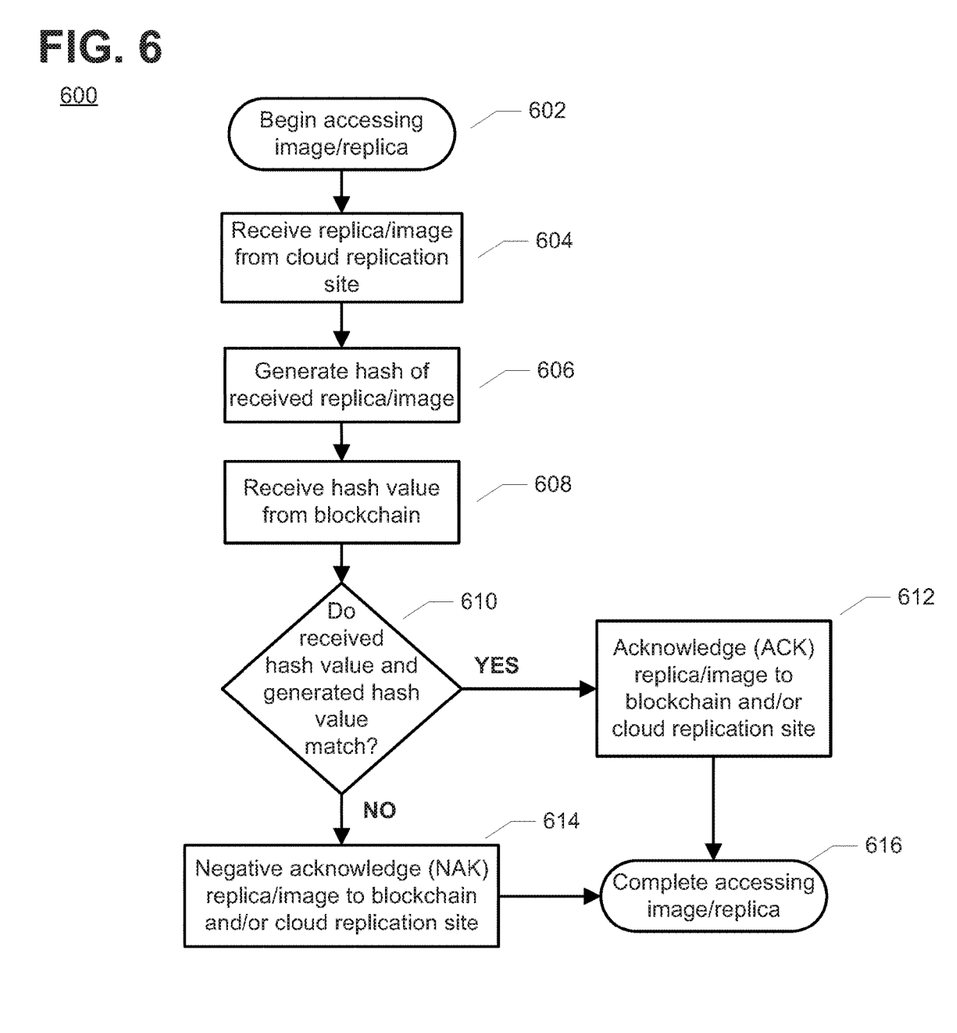
FIG. 6 is a flowchart of an illustrative image recovery process of a production site in a data protection system, in accordance with illustrative embodiments.

Referring to FIG. 6, an illustrative process 600 for accessing an image or replica is shown. For example, process 600 might be performed by production site 102 whenever a replica or image is accessed, such as to recover production site 102 to a desired point in time (PIT) or to test a given image or replica. At block 602, process 600 begins. At block 604, production site 102 receives a desired replica from cloud replication site 122. At block 606, production site 102 generates a hash value of the received replica. At block 608, production site 102 may request and receive the hash value (e.g., hash 204' of FIG. 2) from blockchain 140 that is associated with the replica received at block 604. Blockchain 140 may store a source identifier (e.g., 212) that is uniquely associated with the production site.

At block 610, if the hash value generated at block 606 and the hash value received at block 608 match, then at block 612, production site 102 sends an acknowledgement (ACK) of receipt of the correct replica. For example, the ACK may be sent to one or both of cloud replication site 122 and blockchain 140. If, at block 610, the hash value generated at block 606 and the hash value received at block 608 do not match, then at block 614, production site 102 may send a negative acknowledgement (NAK) of receipt of the replica. For example, the NAK may be sent to one or both of cloud replication site 122 and blockchain 140. At block 616, process 400 completes.

Figure 7:
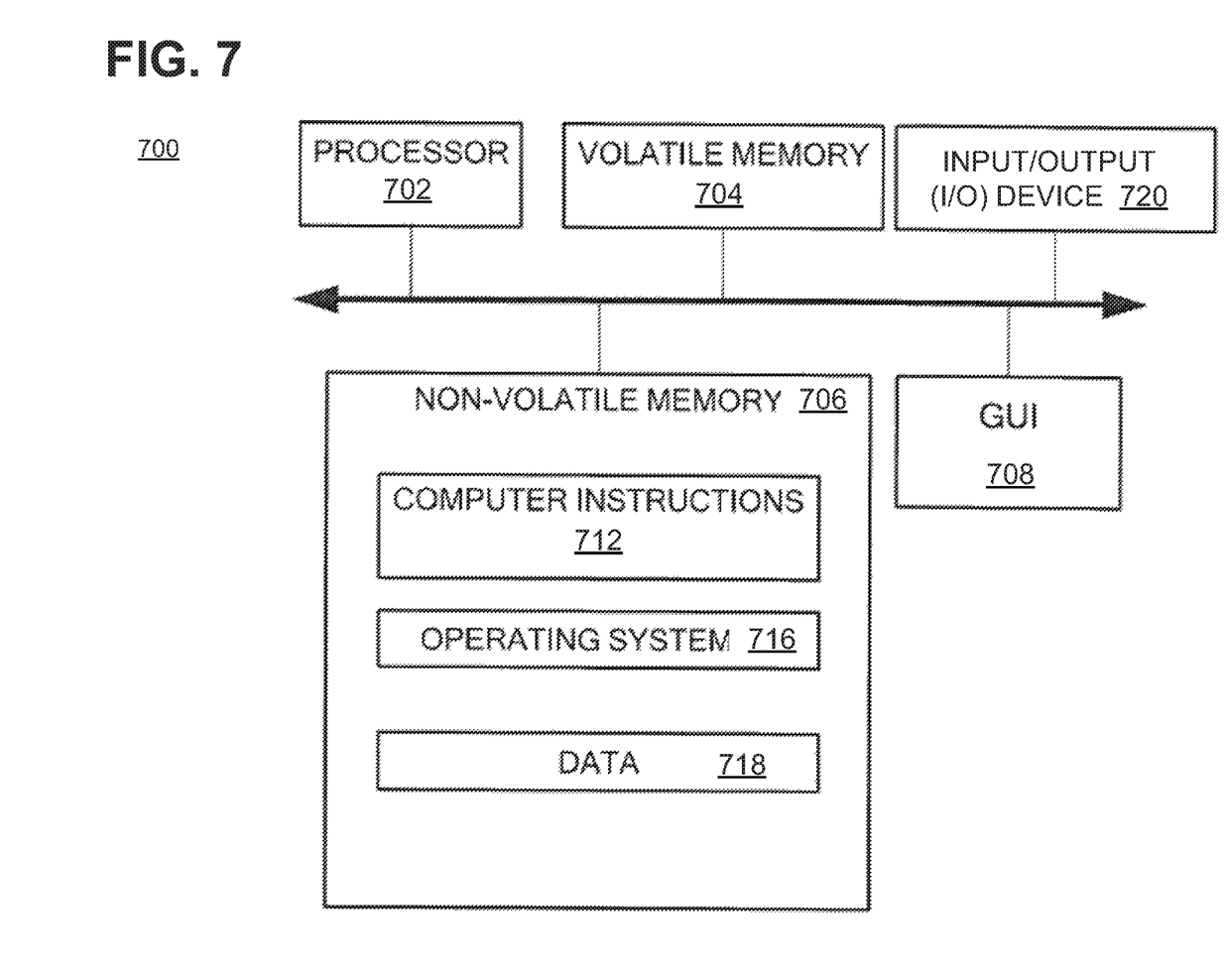
FIG. 7 is a block diagram of an example of a hardware device that may perform at least a portion of the processes in FIGS. 3-6.

In some described embodiments, hosts 104 of FIG. 1 may each correspond to one computer, a plurality of computers, or a network of distributed computers. Similarly, blockchain 140 and cloud replication site 122 may be implemented as a network of two or more distributed computers. For example, in some embodiments, the computers may be implemented as one or more computers such as shown in FIG. 7. As shown in FIG. 7, computer 700 may include processor 702, volatile memory 704 (e.g., RAM), non-volatile memory 706 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 708 (e.g., a touchscreen, a display, and so forth) and input/output (I/O) device 720 (e.g., a mouse, a keyboard, etc.). Non-volatile memory 706 stores computer instructions 712, an operating system 716 and data 718 such that, for example, the computer instructions 712 are executed by the processor 702 out of volatile memory 704 to perform at least a portion of the processes described herein. Program code may be applied to data entered using an input device of GUI 708 or received from I/O device 720.

The processes described herein are not limited to use with the hardware and software of FIG. 7 and may find applicability in any computing or processing environment and with any type of machine or set of machines that may be capable of running a computer program. The processes described herein may be implemented in hardware, software, or a combination of the two.

The processes described herein are not limited to the specific embodiments described. For example, the processes are not limited to the specific processing order shown in FIGS. 2-6. Rather, any of the blocks of the processes may be re-ordered, combined or removed, performed in parallel or in serial, as necessary, to achieve the results set forth herein.

Processor 702 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method comprising:
   generating a replica of a volume at a production site of a storage system and sending the replica to a cloud backup provider;
   generating, by the production site, a hash value of the generated replica;
   providing the hash value of the generated replica to a blockchain;
   in response to a latency of transaction processing in the blockchain, sending the hash value of the generated replica from the production site to the cloud backup provider;
   generating, by the cloud backup provider, a hash value of the received replica;
   comparing, by the cloud backup provider, the generated hash value of the received replica to the hash value of the generated replica from one of the production site and the blockchain based on the latency; and
   verifying, based upon the comparing, the received replica, the verifying including verifying compliance of a service level agreement (SLA) between the production site and the cloud backup provider.

2. The method of claim 1, further comprising:
   receiving, by the cloud backup provider, the hash value of the generated replica from the blockchain.

3. The method of claim 1,
   wherein sending the hash value of the generated replica from the production site to the cloud backup provider is implemented via an application programming interface (API).

4. The method of claim 1, further comprising:
   when the generated hash value of the received replica matches the hash value of the generated replica, verifying and acknowledging, by the cloud backup provider to the production site, the received replica; and
   when the generated hash value of the received replica does not match the hash value of the generated replica, indicating a negative acknowledgement, by the cloud backup provider to the production site, of the received replica.

5. The method of claim 1, further comprising:
   when the generated hash value of the received replica matches the hash value of the generated replica, the acknowledgment to the blockchain includes an indication that the cloud backup provider received correct data with respect to the generated replica; and
   when the generated hash value of the received replica does not match the hash value of the generated replica, the acknowledgment to the blockchain includes an indication that the cloud backup provider did not receive correct data with respect to the generated replica.

6. The method of claim 1, further comprising accessing, by the production site, a desired replica stored by the cloud backup provider, the accessing comprising:
   generating a hash value of the desired replica;
   receiving, by the production site, a hash value of the desired replica from the blockchain;
   comparing the generated hash value of the desired replica to the hash value received from the blockchain; and
   verifying, based upon the comparing, the received desired replica.

7. The method of claim 6, wherein verifying, based upon the comparing, the received desired replica, comprises:
   when the generated hash value of the desired replica matches the hash value received from the blockchain, verifying and acknowledging, by the production site, the desired replica;
   when the generated hash value of the desired replica does not match the hash value received from the blockchain, indicating a negative acknowledgement, by the production site, of the desired replica; and
   sending, by the production site, the acknowledgment or negative acknowledgement to at least one of the blockchain and the cloud backup provider.

8. The method of claim 6, wherein the desired replica is accessed by the production site in response to a recovery operation.

9. The method of claim 1, wherein the verifying compliance of a service level agreement (SLA) between the production site and the cloud backup provider includes:
   verifying generation of specified points in time for replicas are consistent between the production site and the cloud backup provider;
   verifying consistent journal images are maintained between the production site and the cloud backup provider; and
   verifying required retention time of images for replicas.

10. The method of claim 1, wherein the replica and the hash value of the replica are generated by a data protection appliance at the production site.

11. The method of claim 1, further comprising:
    sending, by the cloud backup provider, an acknowledgment to the blockchain with results of the verifying, the acknowledgment stored in the blockchain as part of a block transaction for the generated replica, the block transaction including a timestamp in which the acknowledgment is received at the blockchain, wherein the block transaction provides a record, independent of the production site and the cloud backup site, confirming whether the cloud backup provider received correct data with respect to the generated replica provided to the cloud backup provider from the production site.

12. A system comprising:
    a processor; and
    memory storing computer program code that when executed on the processor causes the processor to operate a storage system, the storage system operable to perform the operations of:
    generating a replica of a volume at a production site of the storage system and sending the replica to a cloud backup provider;
    generating, by the production site, a hash value of the generated replica;
    providing the hash value of the generated replica to a blockchain;
    in response to a latency of transaction processing in the blockchain, sending the hash value of the generated replica from the production site to the cloud backup provider;
    generating, by the cloud backup provider, a hash value of the received replica;
    comparing, by the cloud backup provider, the generated hash value of the received replica to the hash value of the generated replica from one of the production site and the blockchain based on the latency; and verifying, based upon the comparing, the received replica, the verifying including verifying compliance of a service level agreement (SLA) between the production site and the cloud backup provider.

13. The system of claim 12, wherein the storage system is further operable to perform the operations of:
when the generated hash value of the received replica matches the hash value of the generated replica, verifying and acknowledging, by the cloud backup provider to the production site, the received replica; and
when the generated hash value of the received replica does not match the hash value of the generated replica, indicating a negative acknowledgement, by the cloud backup provider to the production site, of the received replica.

14. The system of claim 12, wherein the storage system is further operable to perform the operations of:
accessing, by the production site, a desired replica stored by the cloud backup provider by:
generating a hash value of the desired replica;
receiving, by the production site, a hash value of the desired replica from the blockchain;
comparing the generated hash value of the desired replica to the hash value received from the blockchain; and
verifying, based upon the comparing, the received desired replica.

15. The system of claim 14, wherein the storage system is further operable to perform the operations of:
when the generated hash value of the desired replica matches the hash value received from the blockchain, verifying and acknowledging, by the production site, the desired replica;
when the generated hash value of the desired replica does not match the hash value received from the blockchain, indicating a negative acknowledgement, by the production site, of the desired replica; and
sending, by the production site, the acknowledgment or negative acknowledgement to at least one of the blockchain and the cloud backup provider.

16. A computer program product including a non-transitory computer readable storage medium having computer program code encoded thereon that when executed on a processor of a computer causes the computer to operate a storage system, the computer program product comprising:
computer program code for generating a replica of a volume at a production site of the storage system;
computer program code for generating a hash value of the generated replica and sending the replica to a cloud backup provider;
computer program code for providing the hash value of the generated replica to a blockchain;
in response to a latency of transaction processing in the blockchain, sending the hash value of the generated replica from the production site to the cloud backup provider;
generating, by the cloud backup provider, a hash value of the received replica;
comparing, by the cloud backup provider, the generated hash value of the received replica to the hash value of the generated replica from one of the production site and the blockchain based on the latency; and
verifying, based upon the comparing, the received replica, the verifying including verifying compliance of a service level agreement (SLA) between the production site and the cloud backup provider.

17. The computer program product of claim 16, further comprising:
computer program code for verifying and acknowledging, by the cloud backup provider to the production site, the received replica when the generated hash value of the received replica matches the hash of the generated replica; and
computer program code for indicating a negative acknowledgement, by the cloud backup provider to the production site, of the received replica when the generated hash value of the received replica does not match the hash value of the generated replica.

18. The computer program product of claim 16, further comprising:
computer program code for accessing, by the production site, a desired replica stored by the cloud backup provider by:
computer program code for generating a hash value of the desired replica;
computer program code for receiving, by the production site, a hash value of the desired replica from the blockchain;
computer program code for comparing the generated hash value of the desired replica to the hash value received from the blockchain; and
computer program code for verifying, based upon the comparing, the received desired replica.

* * * * *